(12) United States Patent
Singh

(10) Patent No.: US 9,752,962 B2
(45) Date of Patent: Sep. 5, 2017

(54) ROBUST TIRE FORCES ESTIMATION SYSTEM

(71) Applicant: The Goodyear Tire & Rubber Company, Akron, OH (US)

(72) Inventor: Kanwar Bharat Singh, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 49 days.

(21) Appl. No.: 14/879,457

(22) Filed: Oct. 9, 2015

(65) Prior Publication Data
US 2017/0102293 A1 Apr. 13, 2017

(51) Int. Cl.
*G01M 17/02* (2006.01)

(52) U.S. Cl.
CPC .................................... *G01M 17/02* (2013.01)

(58) Field of Classification Search
None
See application file for complete search history.

(56) References Cited

U.S. PATENT DOCUMENTS

| 6,549,842 B1 | 4/2003 | Hac et al. |
| 8,886,395 B2 | 11/2014 | Singh et al. |
| 2012/0112899 A1* | 5/2012 | Hannon ............... B60C 23/0416 340/445 |
| 2014/0114558 A1 | 4/2014 | Singh et al. |
| 2014/0207329 A1* | 7/2014 | Juzswik ............... B60C 23/0416 701/32.7 |
| 2014/0278040 A1 | 9/2014 | Singh et al. |
| 2015/0057877 A1 | 2/2015 | Singh |
| 2016/0146706 A1* | 5/2016 | Singh ..................... B60T 8/1725 73/8 |

FOREIGN PATENT DOCUMENTS

EP 2957440 A1 12/2015

OTHER PUBLICATIONS

R. Wade Allen, et al., "Estimation of Passenger Vehicle Inertial Properties and Their Effect on Stability and Handling", Systems Technology, Inc., Jan. 8, 2003, vol. 112, 2003.
EPO search report received by Applicant dated Mar. 3, 2017.

\* cited by examiner

*Primary Examiner* — Andre Allen
(74) *Attorney, Agent, or Firm* — Edward T. Kennedy

(57) ABSTRACT

A tire state estimation system is provided for estimating normal force, lateral force and longitudinal forces based on CAN-bus accessible sensor inputs; the normal force estimator generating the normal force estimation from a summation of longitudinal load transfer, lateral load transfer and static normal force using as inputs lateral acceleration, longitudinal acceleration and roll angle derived from the input sensor data; the lateral force estimator estimating lateral force using as inputs measured lateral acceleration, longitudinal acceleration and yaw rate; and the longitudinal force estimator estimating the longitudinal force using as inputs wheel angular speed and drive/brake torque derived from the input sensor data.

10 Claims, 20 Drawing Sheets

Longitudinal Force Estimation

Wheel Rotation Dynamics Model $$I_w \cdot \dot{\omega}_i = T_{bi} - F_{xi} \cdot r$$

- $I_w$ is the moment of inertia of the wheel
- $\omega_i$ is the rotation speed of the wheel
- $T_{bi}$ is the braking torque
- $r$ is the effective rolling radius

| Model inputs | −Wheel angular speed −Drive/brake torque |
| Model Parameter | Rolling radius |
| Model outputs | Individual tire long force |

—22

Longitudinal Force Estimation

Wheel Rotation Dynamics Model

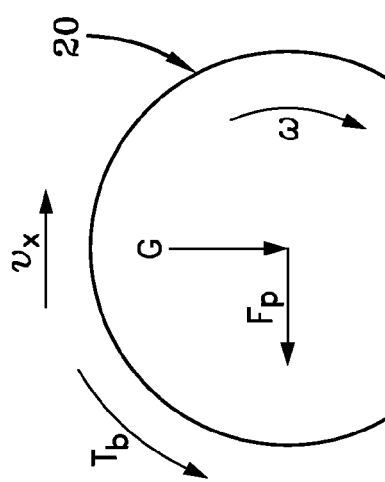

$$I_w \cdot \omega_i = T_{bi} - F_{xi} \cdot r$$

- $I_w$ is the moment of inertia of the wheel
- $\omega_i$ is the rotation speed of the wheel
- $T_{bi}$ is the braking torque
- $r$ is the effective rolling radius

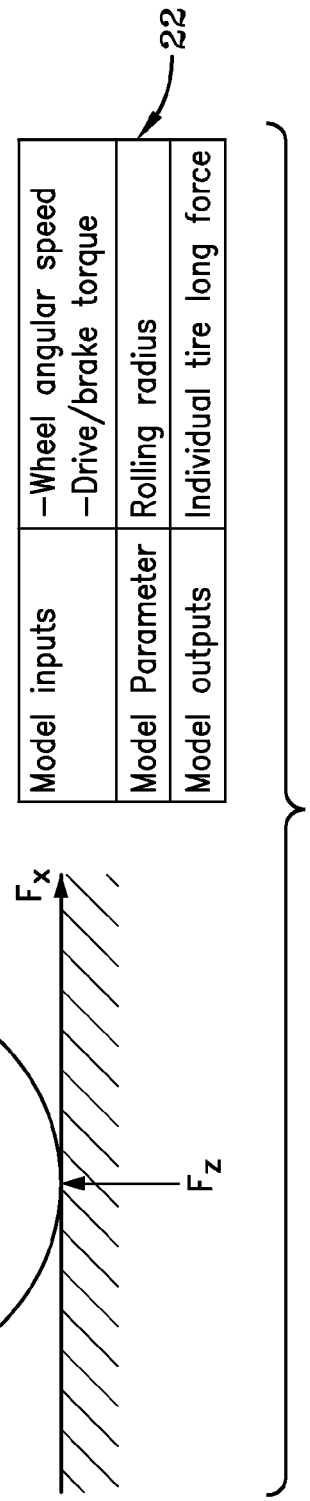

| Model inputs | −Wheel angular speed<br>−Drive/brake torque |
|---|---|
| Model Parameter | Rolling radius |
| Model outputs | Individual tire long force |

FIG-1

Vertical Force Estimation

| Model inputs | Lateral accle, Longitudinal accle, Roll angle |
|---|---|
| Model Parameter | −Mass<br>−Longitudinal CoG position<br>−CoG height |
| Model outputs | Individual tire vertical force |

(32)

$F_{z_{fl}} = F_{Static_{fl}} - W_{LAT,FL} - W_{LONG,FL}$ $F_{z_{fr}} = F_{Static_{fr}} + W_{LAT,FR} - W_{LONG,FR}$ $F_{z_{rl}} = F_{Static_{rl}} - W_{LAT,RL} + W_{LONG,RL}$ $F_{z_{rr}} = F_{Static_{rr}} + W_{LAT,RR} + W_{LONG,RR}$ where:

$W_{LAT,FL} + W_{LAT,RL}, W_{LAT,FR} + W_{LAT,RR} = \left( \dfrac{(m_s \cdot h_r + m_u \cdot h_a)}{t} \cdot a_y \right) + \left( \dfrac{k_{roll} \cdot \phi + c_{roll} \cdot \dot{\phi}}{t} \right)$ $W_{LONG,FL}, W_{LONG,FR}, W_{LONG,RL}, W_{LONG,RR} = \dfrac{m_s \cdot h_{cg}}{2(a+b)} \cdot a_x$

Nomenclature a: Distance from CG to front axle
b: Distance from CG to rear axle
$a_y$: Lateral Accel
$a_x$: Longitudinal Accel
$\phi$: Roll angle
$\dot{\phi}$: Roll rate
t: Track width
$m_s$: Sprung mass
$m_u$: Unsprung mass
$k_{roll}$: Roll stiffness
$c_{roll}$: Roll damping
$h_r$: Roll center height
$h_a$: Height of unsprung mass
$h_{cg}$: CG Height

FIG-3C

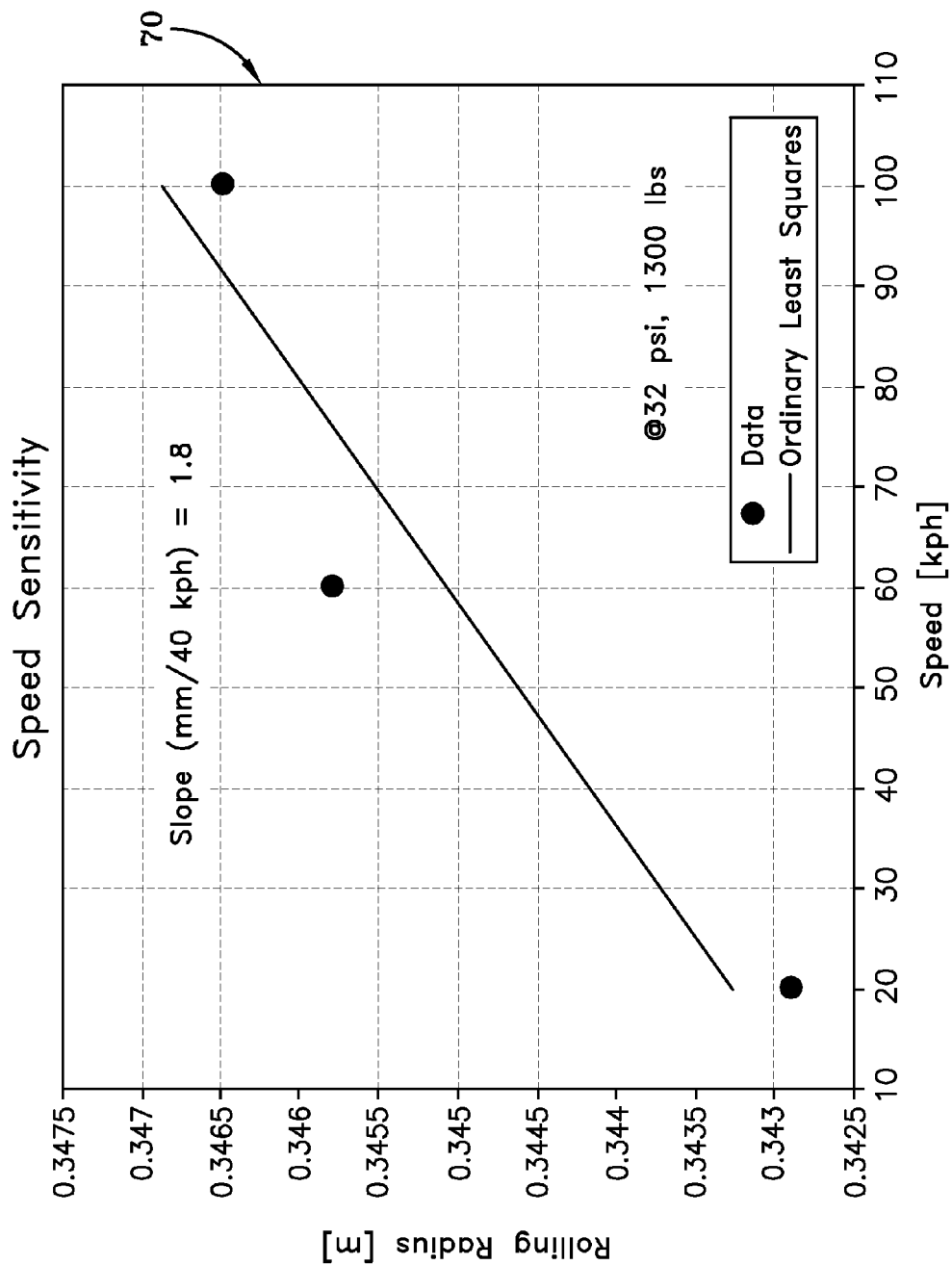

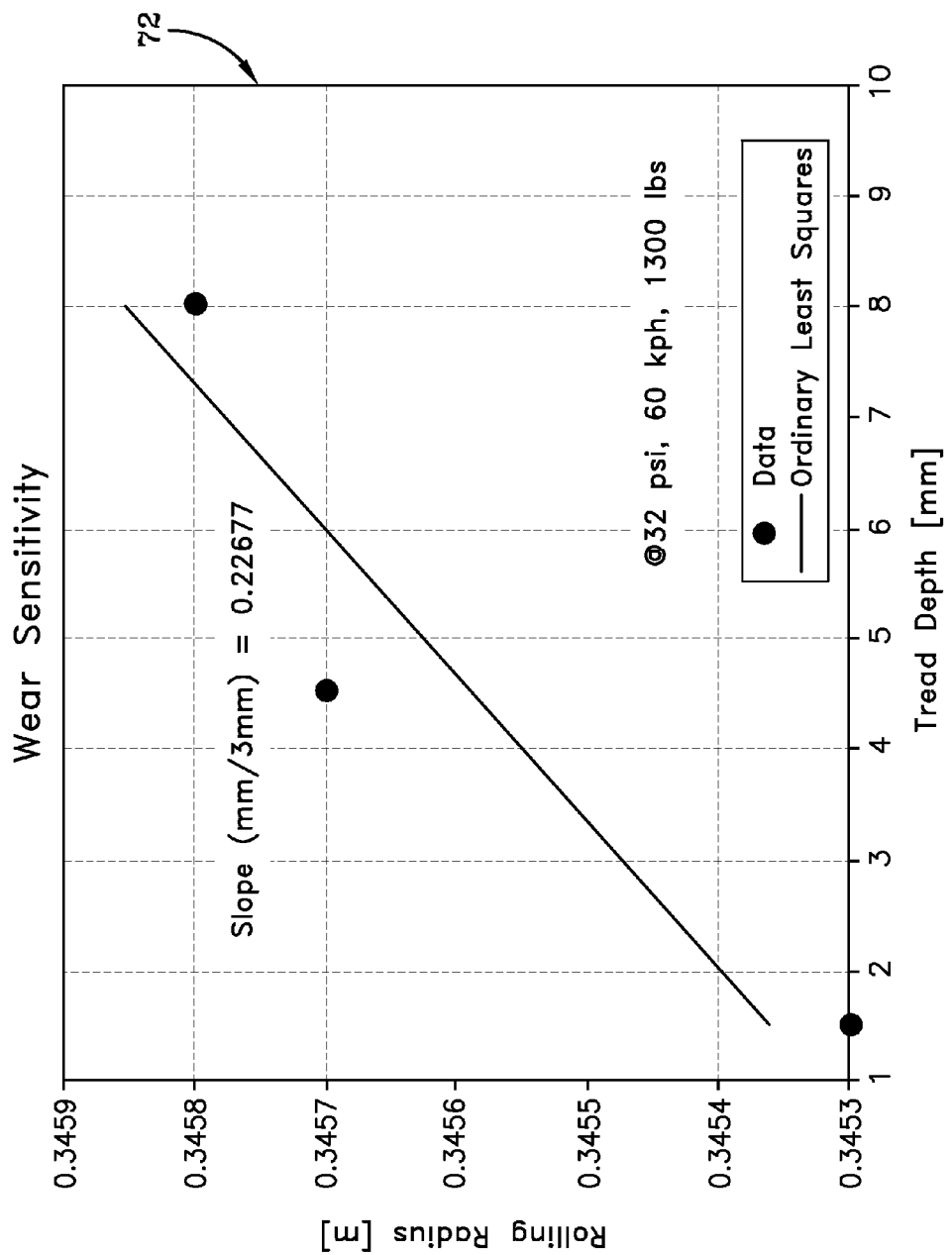

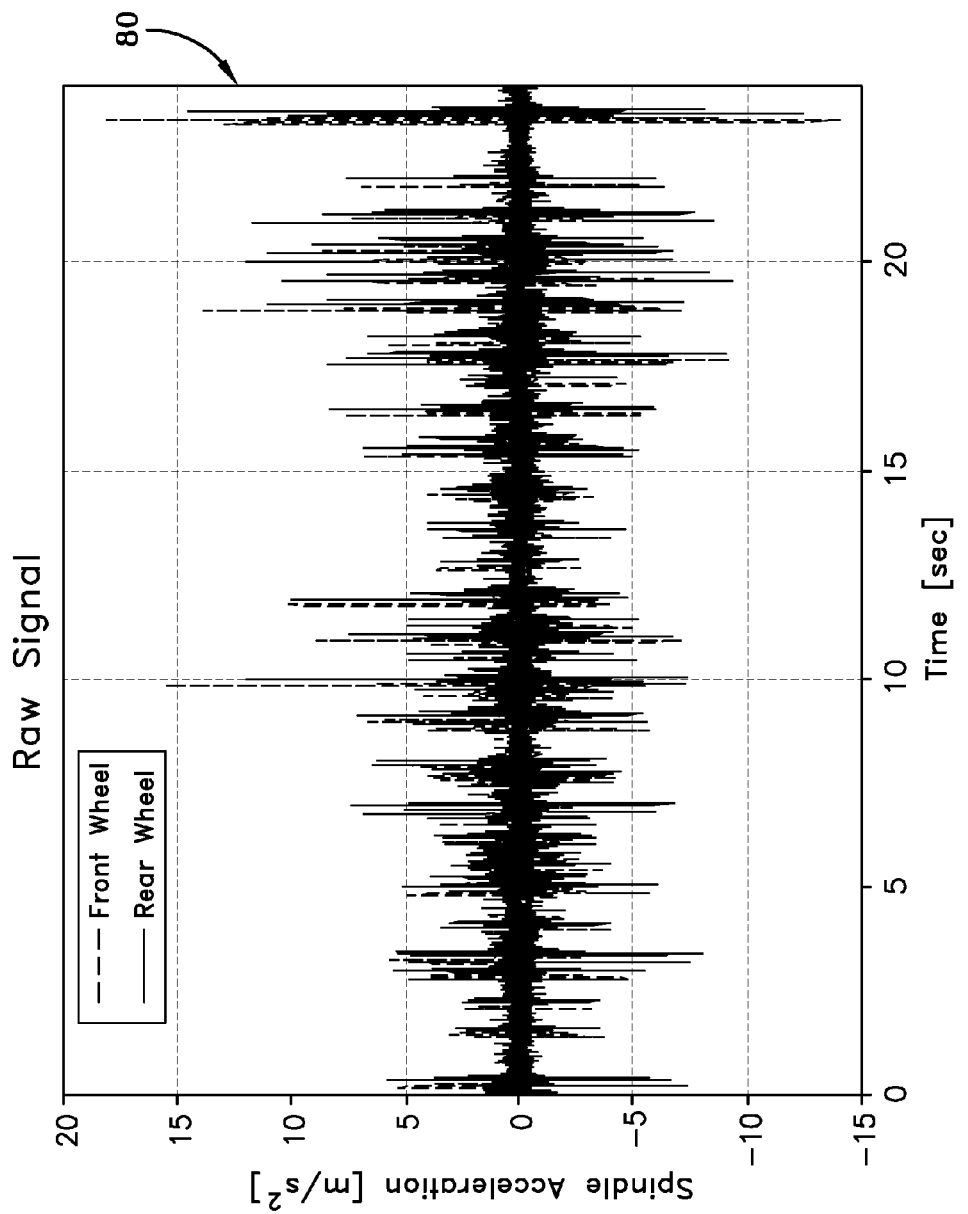

ROBUST TIRE FORCES ESTIMATION SYSTEM

FIELD OF THE INVENTION

The invention relates generally to tire monitoring systems for collecting measured tire parameter data during vehicle operation and, more particularly, to a system for estimating tire forces based upon tire sensor-based measurements in combination with vehicle-based sensor-measured data.

BACKGROUND OF THE INVENTION

An accurate and robust estimation of tire normal, lateral and longitudinal forces is important for certain vehicle safety, control, and operating systems. Achievement of a system for making reliable estimations of tire forces, however, has proven to be problematic. In particular, achievement of a robust system and method for estimating tire forces based upon indirect tire and vehicle sensor measurements over the lifetime of a tire tread has eluded the industry.

It is accordingly desirable to achieve such a robust system that accurately and reliably measures tire forces in vehicle-supporting tires in real time during vehicle operation.

SUMMARY OF THE INVENTION

According to one aspect of the invention, a tire state estimation system is provided for estimating normal force, lateral force, and longitudinal force on a tire mounted to a wheel and supporting a vehicle. The vehicle has a CAN-bus for delivering vehicle sensor-measured input sensor data from a multiple CAN-bus accessible vehicle-mounted sensors including acceleration and angular velocities, steering wheel angle measurement, angular wheel speed of the wheel, roll rate, pitch rate and yaw rate. The system employs a normal force estimator operable to estimate a normal force on the tire from a summation of longitudinal load transfer, lateral load transfer and static normal force using as inputs lateral acceleration, longitudinal acceleration and roll angle derived from the input sensor data; a lateral force estimator operable to estimate a lateral force on the tire from a planar vehicle model using as inputs measured lateral acceleration, longitudinal acceleration, and yaw rate derived from the input sensor data; and a longitudinal force estimator operable to estimate a longitudinal force on the tire from a wheel rotational dynamics model using as inputs wheel angular speed and drive/brake torque derived from the input sensor data.

According to a further aspect, the system employs a roll and pitch angle estimator, an acceleration bias compensation estimator, a center of gravity estimator, a tire rolling radius estimator, a mass estimator operable to generate a vehicle mass estimation from the tire longitudinal force estimation and a road grade angle input, a center of gravity longitudinal position estimator and a yaw inertia adaptation model operable to generate a yaw inertia output from the vehicle mass estimation.

In yet another aspect, the input sensor data excludes data from a global positioning system and data from a vehicle suspension sensor.

Definitions

"ANN" or "Artificial Neural Network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"CAN bus" is an abbreviation for controller area network.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial centerplane (CP)" means the plane perpendicular to the tire's axis of rotation and passing through the center of the tread.

"Footprint" means the contact patch or area of contact created by the tire tread with a flat surface as the tire rotates or rolls.

"Groove" means an elongated void area in a tire wall that may extend circumferentially or laterally about the tire wall. The "groove width" is equal to its average width over its length. A grooves is sized to accommodate an air tube as described.

"Inboard side" means the side of the tire nearest the vehicle when the tire is mounted on a wheel and the wheel is mounted on the vehicle.

"Kalman filter" is a set of mathematical equations that implement a predictor-corrector type estimator that is optimal in the sense that it minimizes the estimated error covariance when some presumed conditions are met.

"Lateral" means an axial direction.

"Lateral edges" means a line tangent to the axially outermost tread contact patch or footprint as measured under normal load and tire inflation, the lines being parallel to the equatorial centerplane.

"Luenberger observer" is a state observer or estimation model. A "state observer" is a system that provide an estimate of the internal state of a given real system, from measurements of the input and output of the real system. It is typically computer-implemented, and provides the basis of many practical applications.

"MSE" is an abbreviation for mean square error, the error between and a measured signal and an estimated signal which the Kalman filter minimizes.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Sensor" means a device mounted to a vehicle or to a tire for the purpose of measuring a specific vehicle or tire parameter and communicating the parameter measurement either wirelessly or via a vehicle CAN-bus for application.

"PSD" is power spectral density (a technical name synonymous with FFT (fast fourier transform).

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 1 is a wheel rotational dynamics model and longitudinal force estimation made therefrom.

FIG. 3C is a vertical force estimation method using designated algorithms.

FIG. 7A is a graph showing rolling radius sensitivity to speed.

FIG. 7B is a graph showing rolling radius sensitivity to tire wear condition.

FIG. 9A is a graph showing vehicle speed estimation based on correlation analysis of time dependent signals to show algorithm validation.

DETAILED DESCRIPTION OF THE INVENTION

Figure 4:
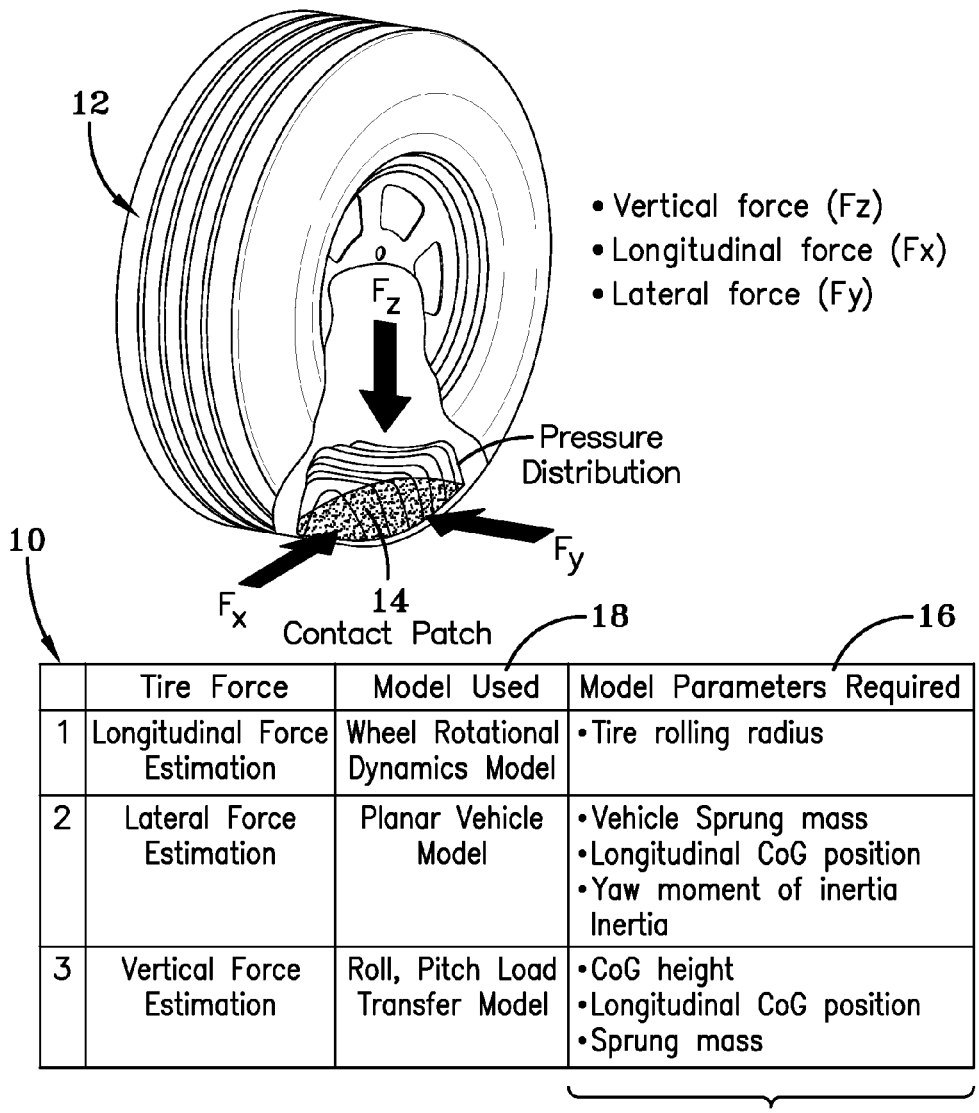
FIG. 4 is a table of vehicle inertial parameters used in estimation of longitudinal, lateral, and vertical forces.

Referring initially to FIG. 4, a summary of the subject robust tire force estimation system and method is shown by the table 10 presented. A tire 12 creates a contact patch 14 on a ground surface as it rotates. Tire forces $F_x$ (longitudinal), $F_z$ (vertical) and $F_y$ (lateral) are created within the tire and identification of such forces are used to determine vehicle performance parameters. As seen in table 10, the goal of the subject system and method is to estimate the listed vehicle inertial parameters (column 16) using standard vehicle sensors such as accelerometers and a gyroscope, i.e. signals available on major vehicle controller area networks (CAN-bus). The subject system force estimate is made without using global positioning system (GPS) or suspension. The forces $F_x$, $F_y$, $F_z$ are estimated using the model identified for each in column 18 as will be explained below. While a number of alternative approaches for estimating such forces have been proposed, they unanimously use fixed vehicle parameters such as inertial parameters to estimate the tire forces. However, depending on how the vehicle is loaded, inertial parameters of the vehicle, including mass, moments of inertia, and spatial components for location of center of mass, can have different magnitudes. The subject system and method is more robust in avoiding the use of load-dependent inertial parameters.

With reference to FIG. 1, the longitudinal force estimation approach of the subject system is represented. From the wheel rotation dynamics model 20, the equations shown are generated. Model inputs for the model 20 are shown in table 22 to include wheel angular speed and drive/brake torque. The model parameter is rolling radius and the model output yields individual tire longitudinal force ($F_x$).

Figure 2:
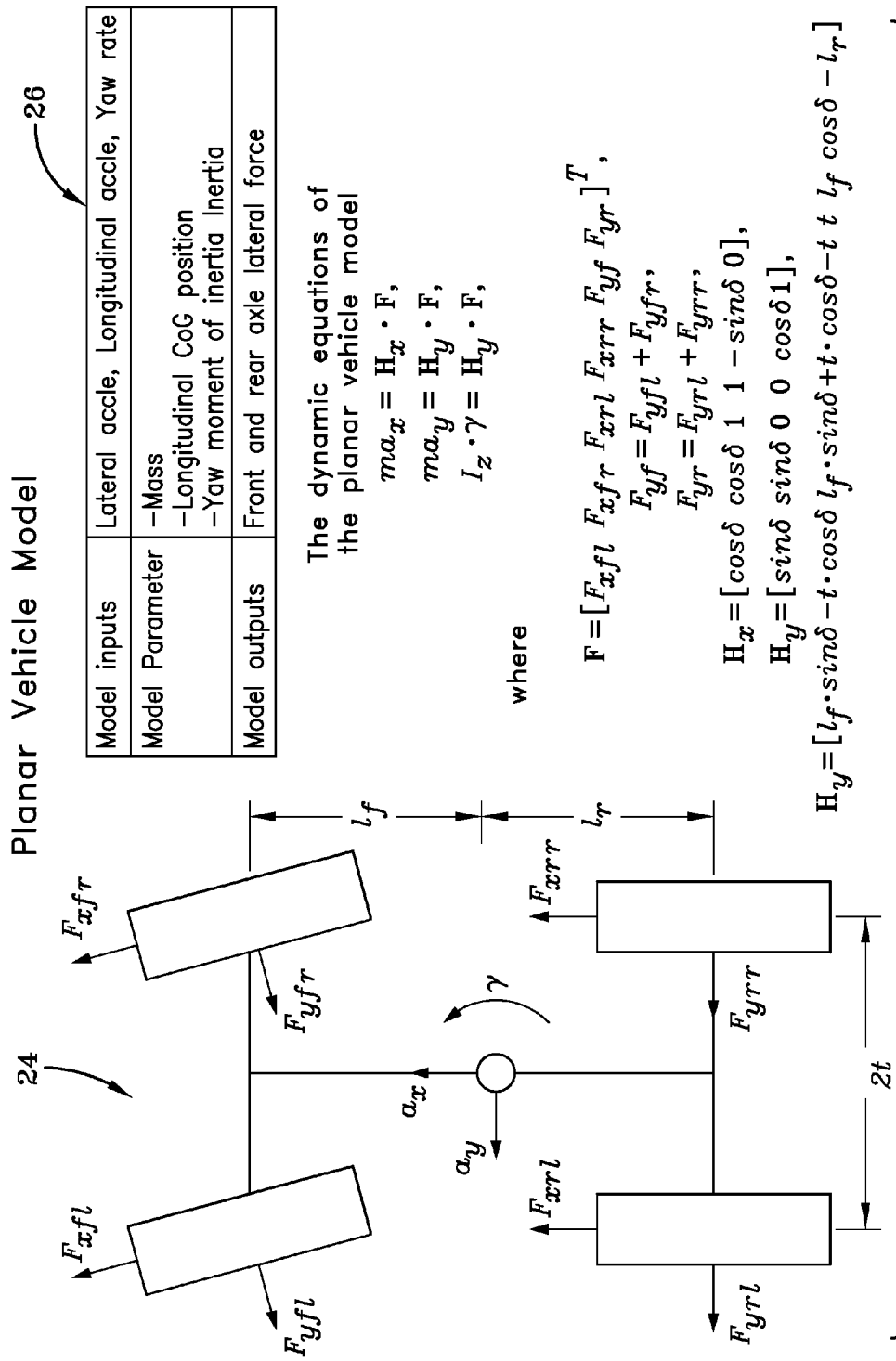
FIG. 2 is a planar vehicle model and the lateral force estimation made therefrom.

FIG. 2 shows the scheme for estimation of lateral force ($F_y$). A planar vehicle model 24 is used in the estimation, generating the dynamic equations shown. In table 26, the model inputs of lateral acceleration, longitudinal acceleration and yaw rate are used to determine the model parameters of mass, longitudinal center of gravity (CoG) and yaw moment of inertial. The model outputs front and rear axle lateral force ($F_y$). For the equations shown, $F_{xi}$ is the longitudinal force of each wheel, $F_{yi}$ is the lateral force of each wheel (where fl, fr, rl and a represent the front left, front right, rear left, and rear right wheel, respectively, hereinafter inclusive) and $F_{yf}$ and $F_{yr}$ are the lateral forces of the front and rear axle, respectively. δ is the steering angle of the front wheels, m is the mass of the vehicle, $a_x$ and $a_y$ are the longitudinal and lateral accelerations of the vehicle, respectively, γ is the yaw rate of the vehicle, $I_z$ is the moment of inertia of the vehicle, $I_f$ and $I_r$ are the distances from the center of mass of the vehicle to the front axle and rear axle, respectively, and 2t is the wheel base. Inputs, parameters and outputs for the model are as indicated in table 26.

Figure 3A:
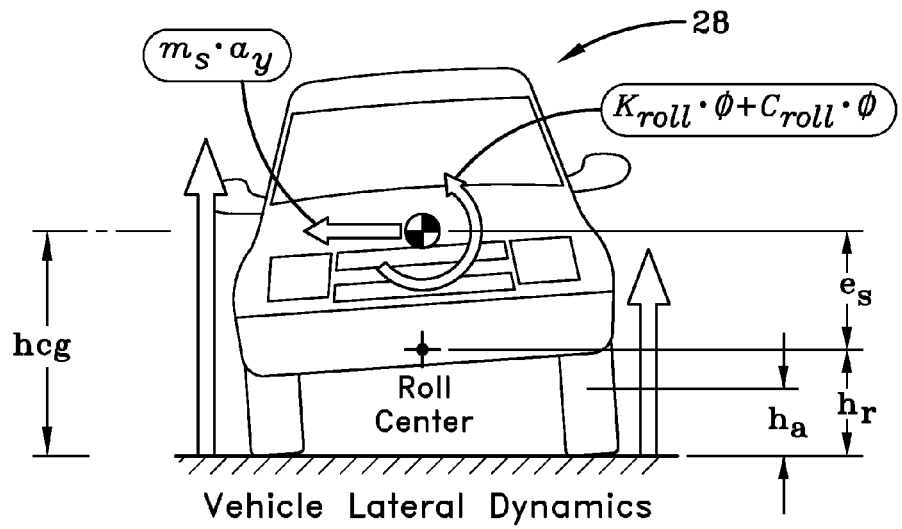
FIG. 3A is a vertical force estimation model.
Figure 3B:
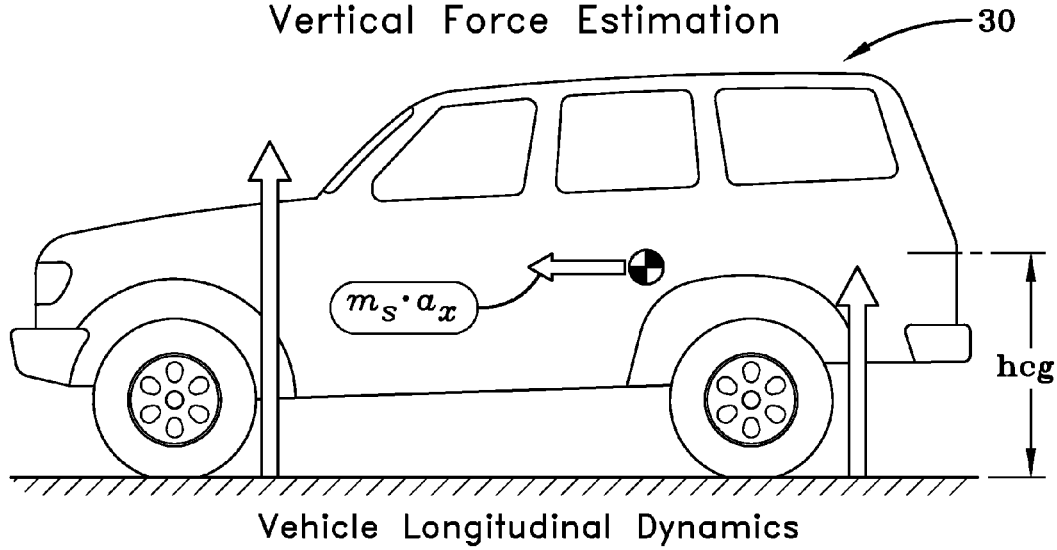
FIG. 3B is a vehicle representation used in making a vertical force estimation from the model of FIG. 3A.

Referring to FIGS. 3A through 3C, the vertical force estimation used in the subject system and method are described. The vertical tire forces can be estimated by the summation of longitudinal load transfer, lateral load transfer and static normal force. FIG. 3A represents a vehicle lateral dynamics model showing the vehicle CoG and identifying model parameters. FIG. 3B shows a vehicle longitudinal dynamics model and CoG for the vehicle. In FIG. 3C, equations are identified from which to calculate an estimation of longitudinal load transfer, lateral load transfer and static normal force. The table 32 identifies the model inputs, model parameters and model output of individual tire vertical force ($F_z$).

Figure 5A:
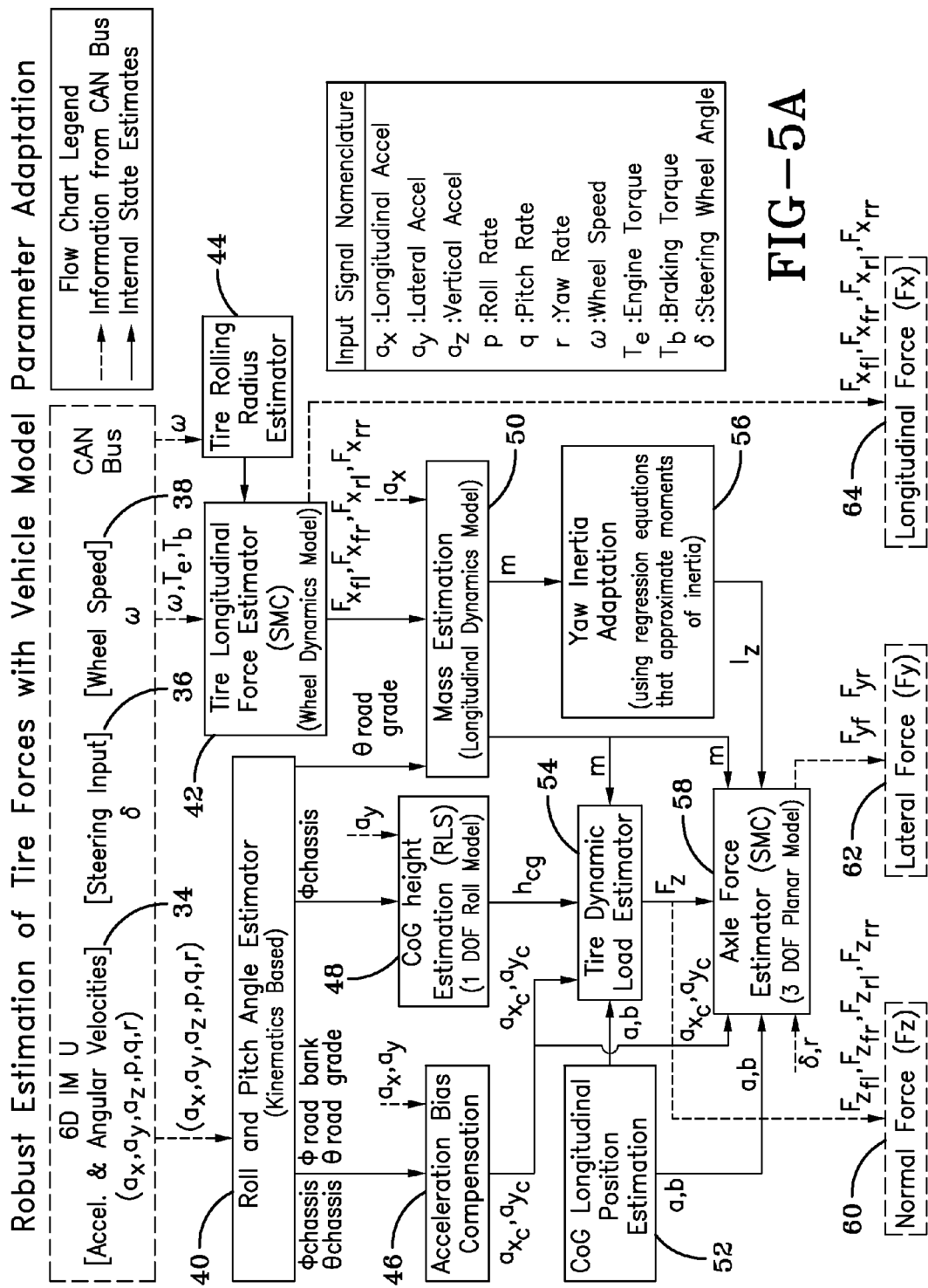
FIG. 5A is a summary flow diagram for the robust estimation of tire forces with vehicle model parameter adaptation.

A diagram of the robust estimation of tire forces with vehicle model parameter adaptation is seen in FIG. 5A. Information from CAN-bus sensors is shown in broken line arrows while the internal state estimates are shown in solid line arrow. A 6D IM U 34 provides acceleration and angular velocities from the CAN-bus. Steering input 36 and wheel speed 38 are likewise provided by means of the vehicle CAN-bus.

Acceleration measurements, roll rate, pitch rate and yaw rate are provided from a 6D IM U unit 34 mounted to the vehicle and available by CAN-bus with steering input 36 and wheel speed 38. A kinematics based roll and pitch angle estimator 40 receives the acceleration, roll rate, pitch rate and yaw rate and provides an estimation of roll and pitch angles to a RLS CoG height estimation model (1 DOF roll model) 48 to yield a height estimation $h_{cg}$. The acceleration data $a_x$ and $a_y$ are used in an acceleration bias compensation adjustment 46 to yield compensated acceleration measurement $a_{xc}$ and $a_{yc}$. The compensated acceleration measurements $a_{xc}$ and $a_{yc}$ with height estimation $h_{cg}$ are inputs to a tire dynamic load estimator 54 with CoG longitudinal position estimation a, b from estimator 52 and mass estimation m from estimator 50. The tire dynamic load estimator 54 outputs a load estimation normal force ($F_z$) 60.

Wheel speed, engine torque and braking torque available from the CAN-bus as inputs to a tire longitudinal force estimator (SMC) 42 with tire rolling radius estimation 44 to yield longitudinal force estimations $F_{xfl}$, $F_{xfr}$, $f_{xrl}$ and $F_{xrr}$ 64. The longitudinal force estimations are inputs with road grade θ and longitudinal acceleration $a_x$ to a longitudinal dynamics mass estimation model 50. An estimation of mass m is generated by the model 50. Mass m is used in a yaw inertia adaptation model 56 that uses regression equations to approximate moments of inertia L.

The load estimation $F_z$ from the tire dynamic load estimator 54, the compensated acceleration data $a_{xc}$ and $a_{yc}$, the yaw inertial adaptation $I_z$, mass "m" and CoG position estimation a, b are inputs to an axle force estimator configured as a 3 DOF Planar (SMC) model 58. Lateral force ($F_y$) 62 is an estimation output from the axle force estimator 58.

The model equations used in creating the normal force ($F_z$) 60, the lateral force ($F_y$) 62, and the longitudinal force ($F_x$) 64 estimations from the system and method of FIG. 5A are as described previously.

Figure 5B:
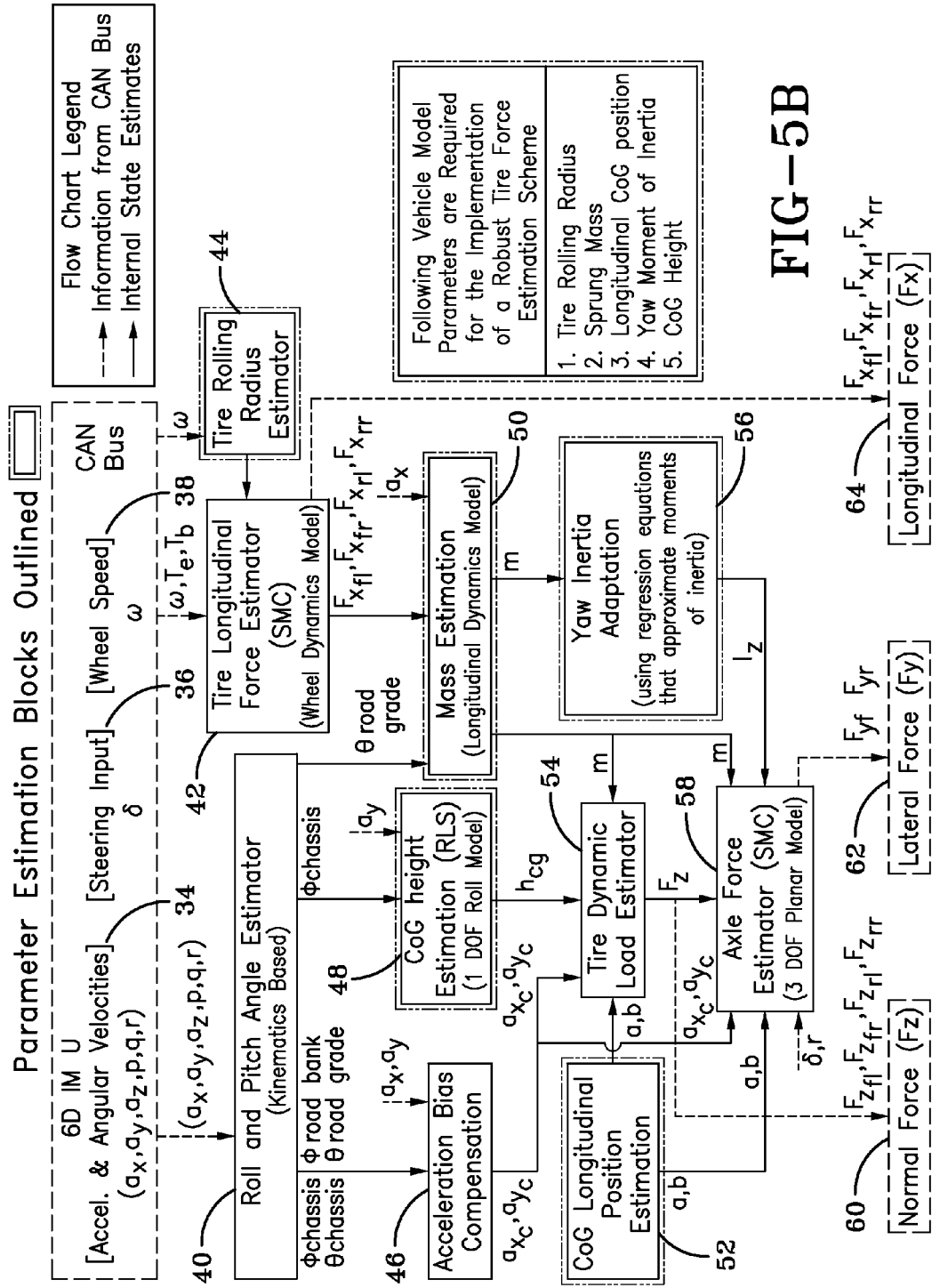
FIG. 5B is a flow diagram showing parameter estimation blocks outlined.

In FIG. 5B, the parameter estimation blocks are outlined in broken line as indicated. The parameters estimated are tire rolling radius 44, mass 50, CoG longitudinal position 52, yaw inertia adaptation 56 and CoG height 48. The derivation of tire rolling radius 44 is explained below. Vehicle sprung mass and longitudinal CoG position are derived as set forth in issued U.S. Pat. No. 8,886,395 entitled DYNAMIC TIRE SLIP ANGLE ESTIMATION SYSTEM AND METHOD issued Nov. 11, 2014, and U.S. Patent Publication No. 2014/0278040 entitled VEHICLE DYNAMIC LOAD ESTIMATION SYSTEM AND METHOD filed Mar. 12, 2013 and published Sep. 18, 2014. U.S. Pat. No. 8,886,395 and Application Publication No. 2014/0278040 are incorporated herein by reference in their entireties. The yaw inertia adaptation 56 is estimated using regression equations that approximate moments of inertia. Such equations are set forth and discussed in the paper authored by Allen R. Wade, et al. entitled "Estimation of Passenger Vehicle Inertial Properties and Their Effect on Stability and Handling" No. 2003-01-966. *SAE Technical Paper,* 2003, which paper being incorporated herein in its entirety. The CoG height estimation 48 is set forth in co-pending U.S. Patent Publication No. 2014/0114558 entitled VEHICLE WEIGHT AND CENTER OF GRAVITY ESTIMATION SYSTEM AND METHOD, filed Oct. 19, 2012, and published Apr. 24, 2014, incorporated herein in its entirety by reference.

It will be seen from FIGS. 5A and 5B that the subject estimates of longitudinal force, lateral force and vertical force are "robust" in the sense that the estimates of vehicle inertial parameters use standard vehicle sensors such as accelerometers and a gyroscope, signals available on major vehicle controller area networks. Global positioning system (GPS) or suspension displacement sensors are not used. Hence, the subject system and method for making its force estimates are GPS independent and suspension displacement measurement independent and consequently are referred to as "robust".

Figure 6A:
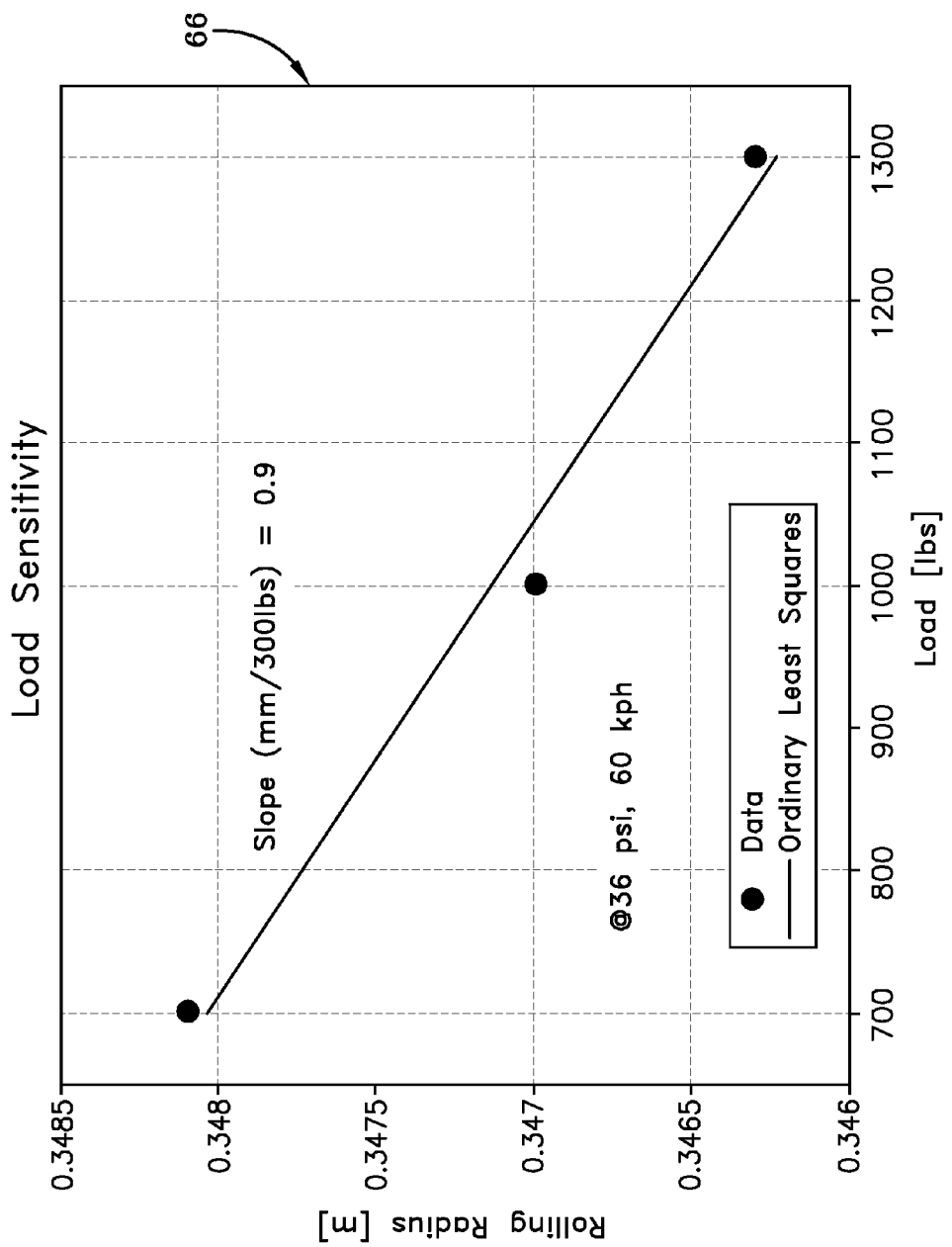
FIG. 6A is a graph showing rolling radius sensitivity to tire load.
Figure 6B:
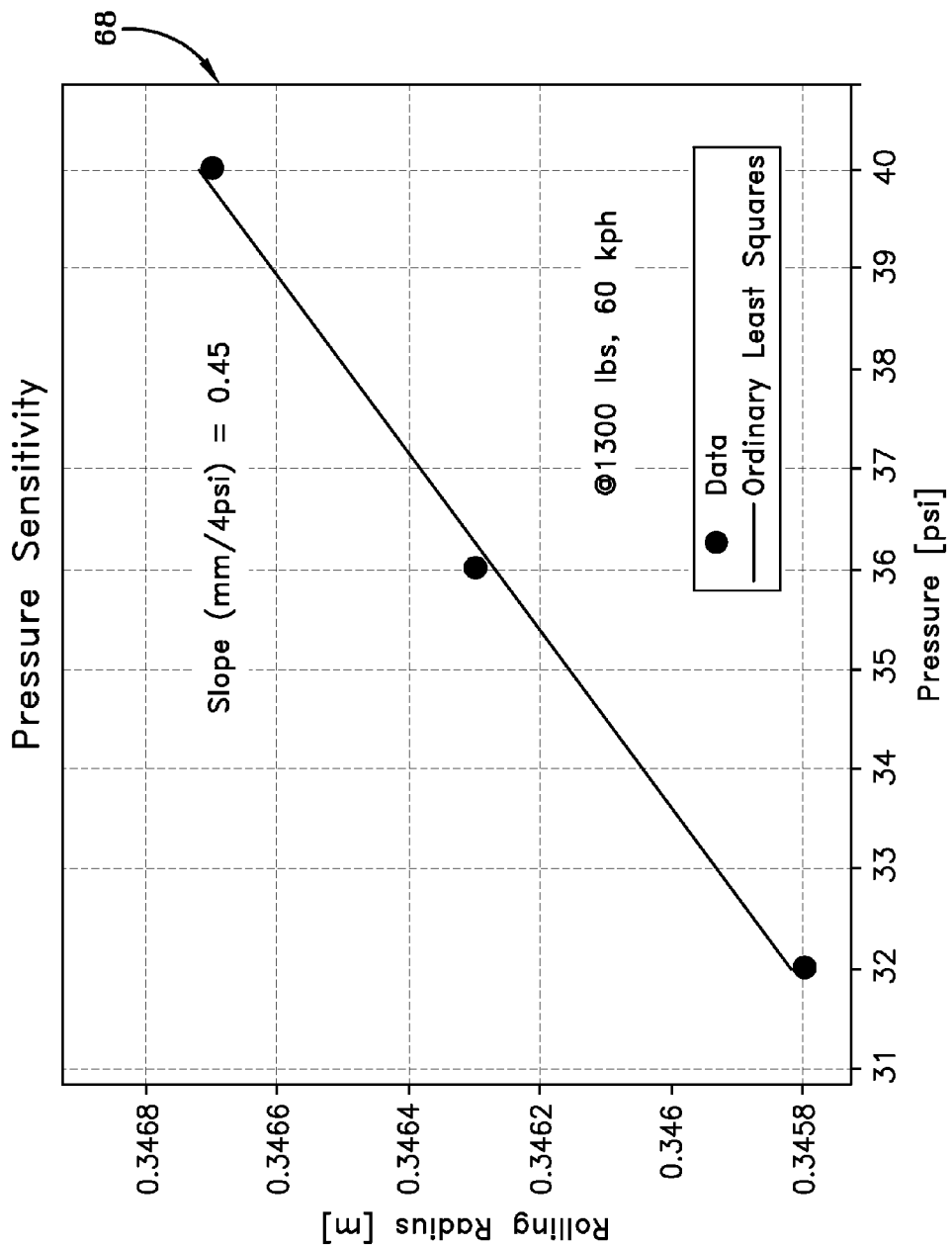
FIG. 6B is a graph showing rolling radius sensitivity to tire inflation pressure.

The methodology for estimation of rolling radius 44 will be understood from the experimentally derived sensitivity graph 66 of FIG. 6A (load), graph 68 of FIG. 6B (pressure), graph 70 of FIG. 7A (speed), graph 72 of FIG. 7B (wear). The sensitivity of rolling radius to load is the slope of the line of FIG. 6A or 0.9 mm/300 pounds. The sensitivity of rolling radius to tire pressure in FIG. 6B is seen as 0.45 mm/4 psi. The sensitivity of rolling radius to speed is seen in FIG. 7A as 1.8 mm/40 kph. The sensitivity to tire wear is seen in FIG. 7B as 0.22677 mm/3 mm. Tire rolling radius is thus shown to be a function of load, pressure, speed and tire wear state with increasing load and decreasing tread depth acting to decrease rolling radius and increasing pressure and increasing speed acting to increase rolling radius.

Figure 8:
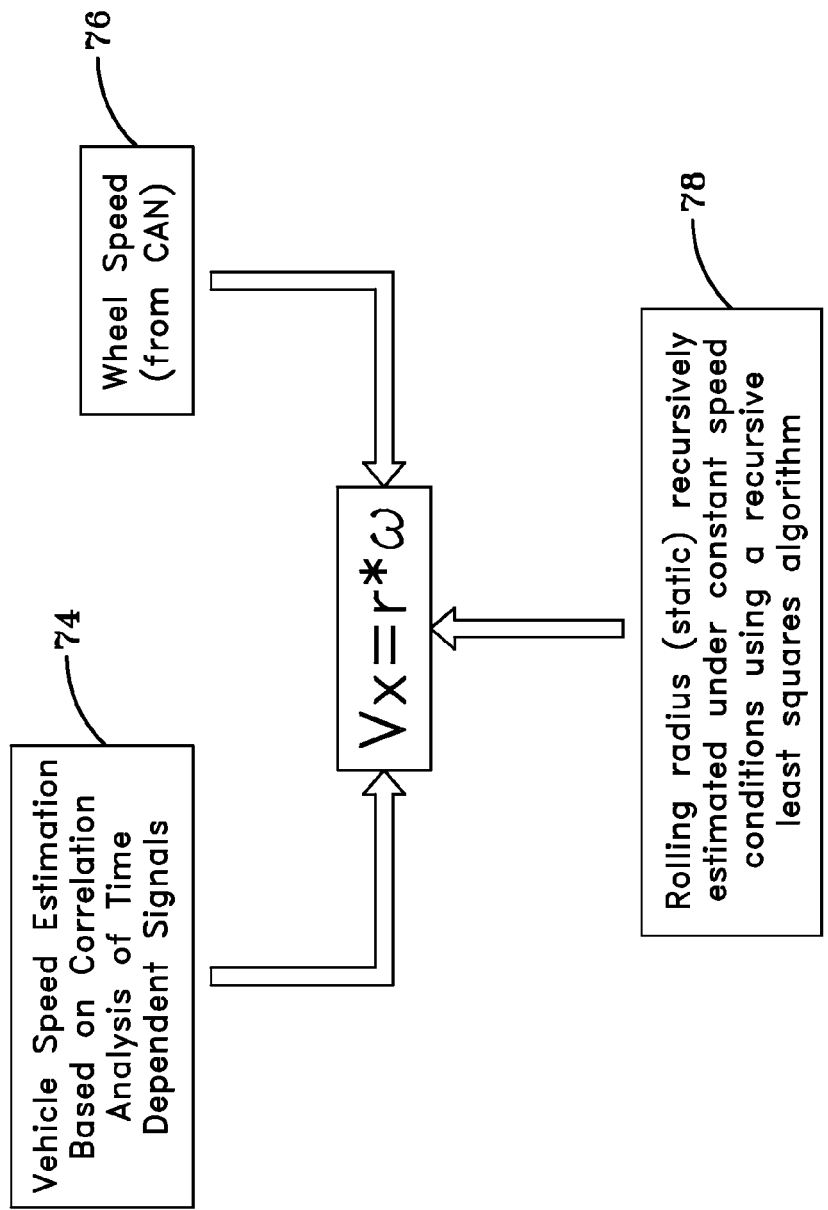
FIG. 8 is a schematic on the method of updating tire rolling radius based upon vehicle speed.
Figure 9B:
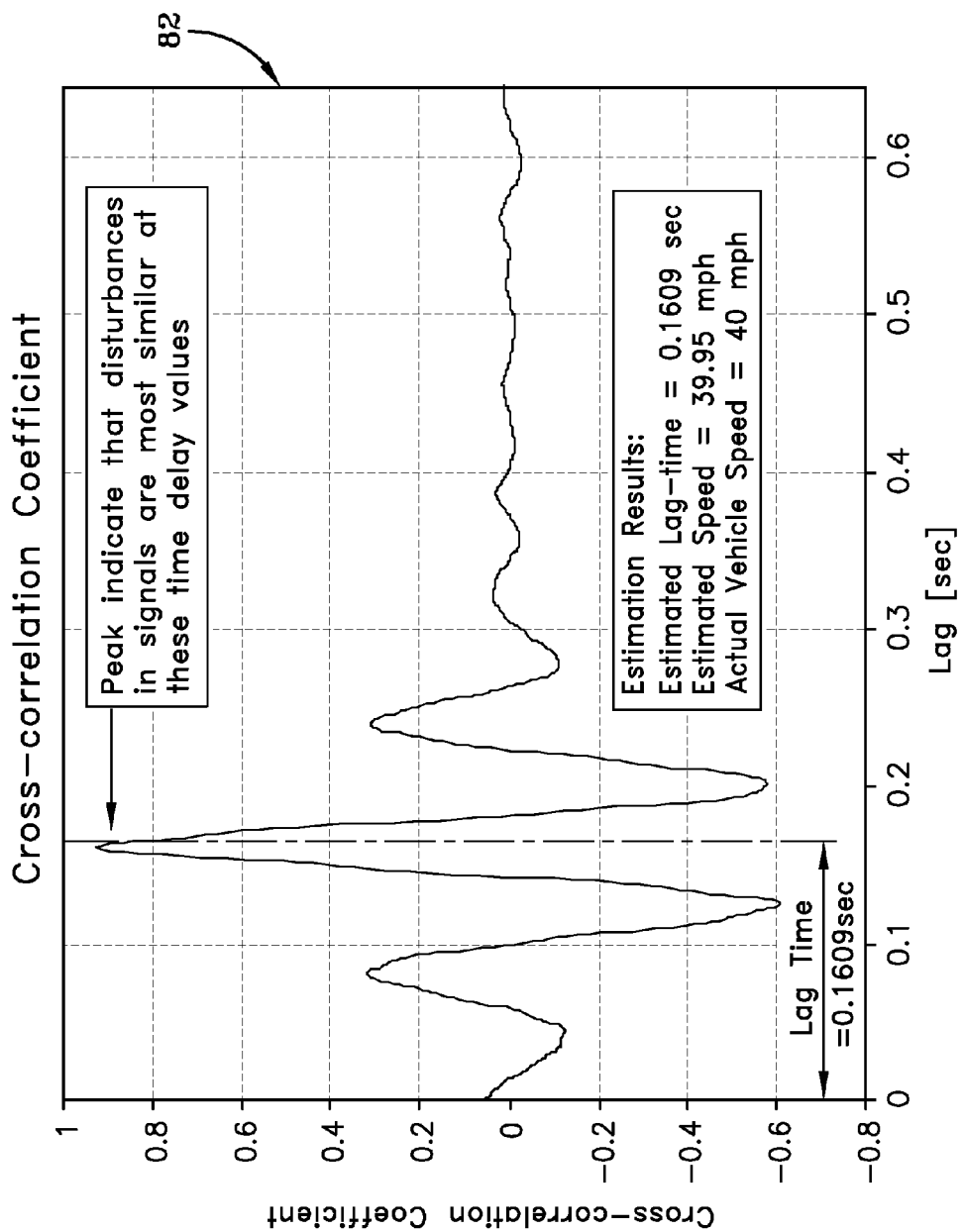
FIG. 9B is a graph showing cross-correlation coefficient over time in estimating vehicle speed in comparison with actual vehicle speed.

The rolling radius can therefore be updated as seen in FIG. 8 by vehicle speed estimation based on correlation analysis of time dependent signals 74. Wheel speed in the equation shown is obtained from the CAN-bus of the vehicle as seen at 76 while rolling radius (static) r is recursively estimated under constant speed conditions using a recursive least squares algorithm as seen at block 78. Vehicle speed estimation is shown schematically in FIGS. 9A and 9B and is based on correlation analysis of time dependent signals. The graph 80 graphs spindle acceleration for both front and rear wheels as a first step. In FIG. 9B, cross-correlation coefficient against lag [sec] is graphed at 82. The peak in the graph 82 of FIG. 9B indicates that disturbances in signals are most similar at these time delay values. For example, from the raw signal of FIG. 9A the cross-correlation coefficient graph 82 is generated.

The algorithm speed [mph]=(wheel base [m]/lag time [sec]) is used in estimating speed. FIG. 9B indicates a lag time of 0.1609 seconds, from which an estimated speed of 39.95 mph is determined through application of the algorithm. The actual vehicle speed of 40 mph compares favorably with estimated, whereby validating use of the algorithm above. It will be noted that this method is only applicable when the vehicle is driving with constant velocity. A varying vehicle velocity would result in a smearing of the peak in FIG. 9B in the cross correlation function since the peak shifts with increasing velocity to the left and decreasing velocity to the right. Once the speed estimation is made, it may be used to update the rolling radius estimation pursuant to use of the algorithm of FIG. 8.

The force estimation made pursuant to the methodology of FIGS. 5A, 5B may be validating via track testing using the following vehicle parameters:
m=1722; % kg
$m_s$=1498; % kg
$m_u$=m-ms; % kg
a=1.33; % m
b=1.33; % m
t=1.619; % m
$h_{cg}$=0.545; CG height from ground % m
$h_r$=0.13; % roll center height from ground % m
$h_a$=0.1; % unsprung mass height from ground % m
$c_{roll}$=1000; % roll damping N-sec/m
$k_{roll}$=1300% roll stiffness Nm/deg.

Figure 10A:
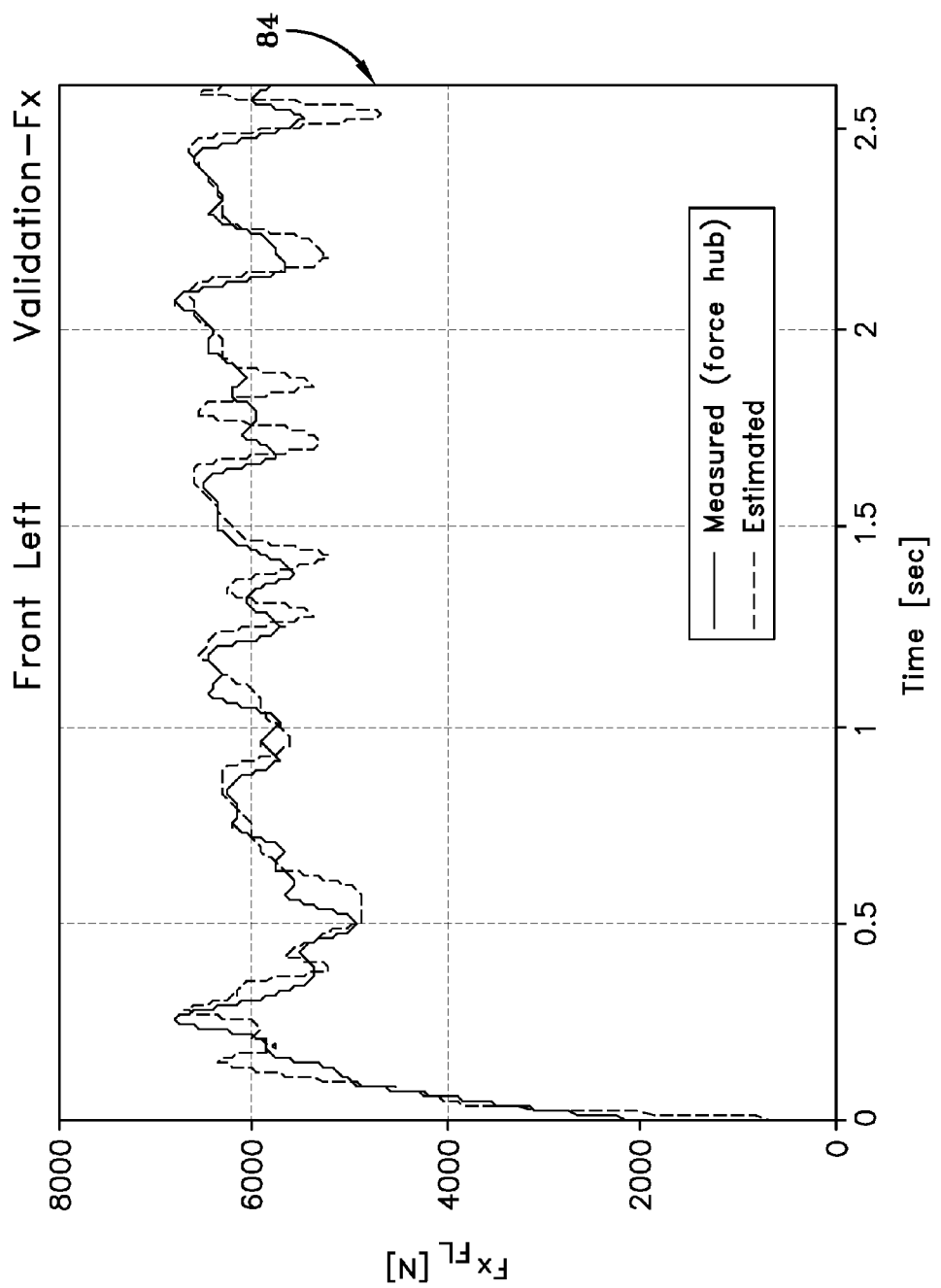
FIG. 10A is a graph showing experimental validation via track testing of force estimations, comparing estimated with measured Fx for a front left tire.
Figure 10B:
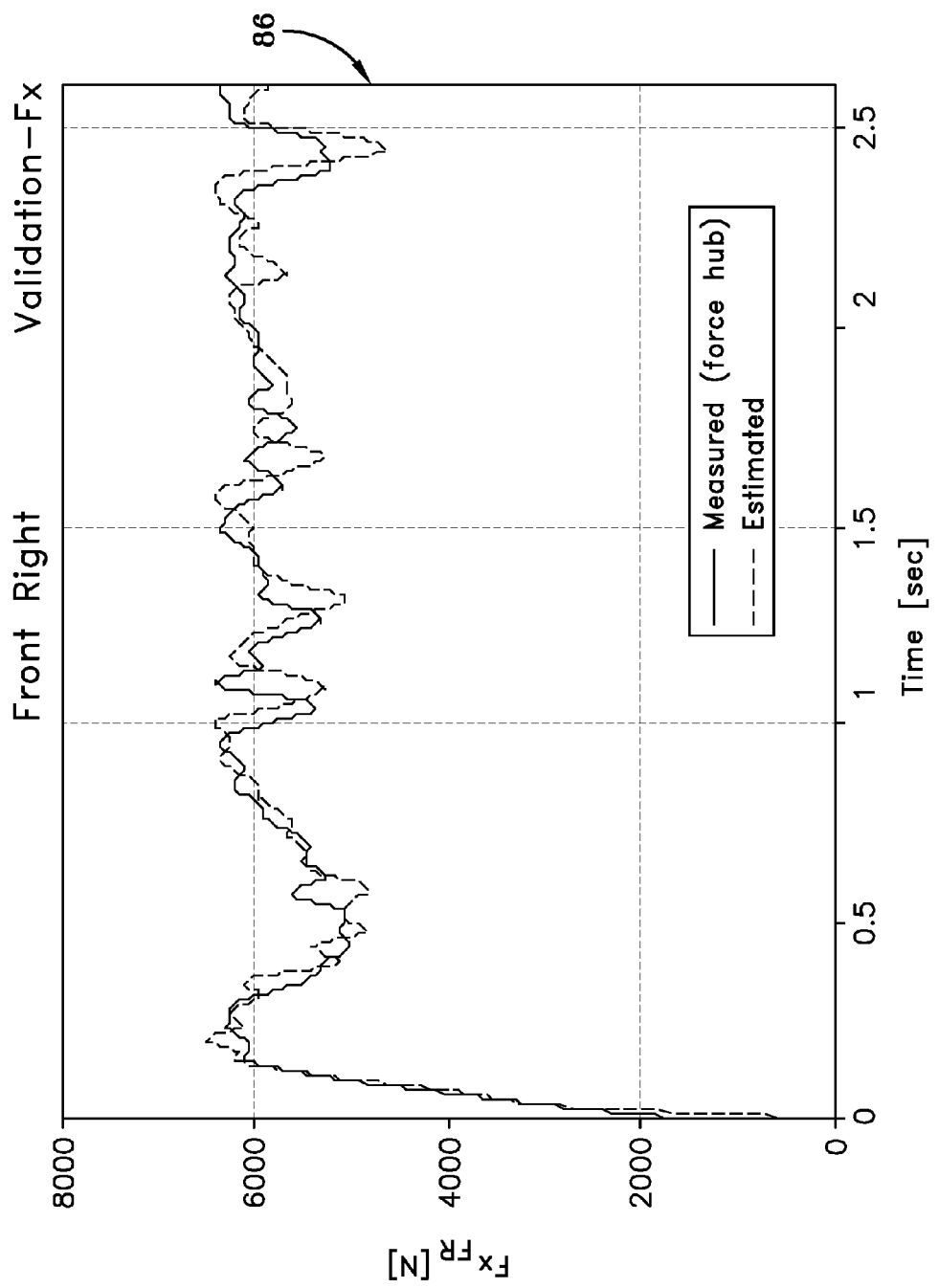
FIG. 10B is a graph similar to FIG. 10A but for the front right tire.
Figure 10C:
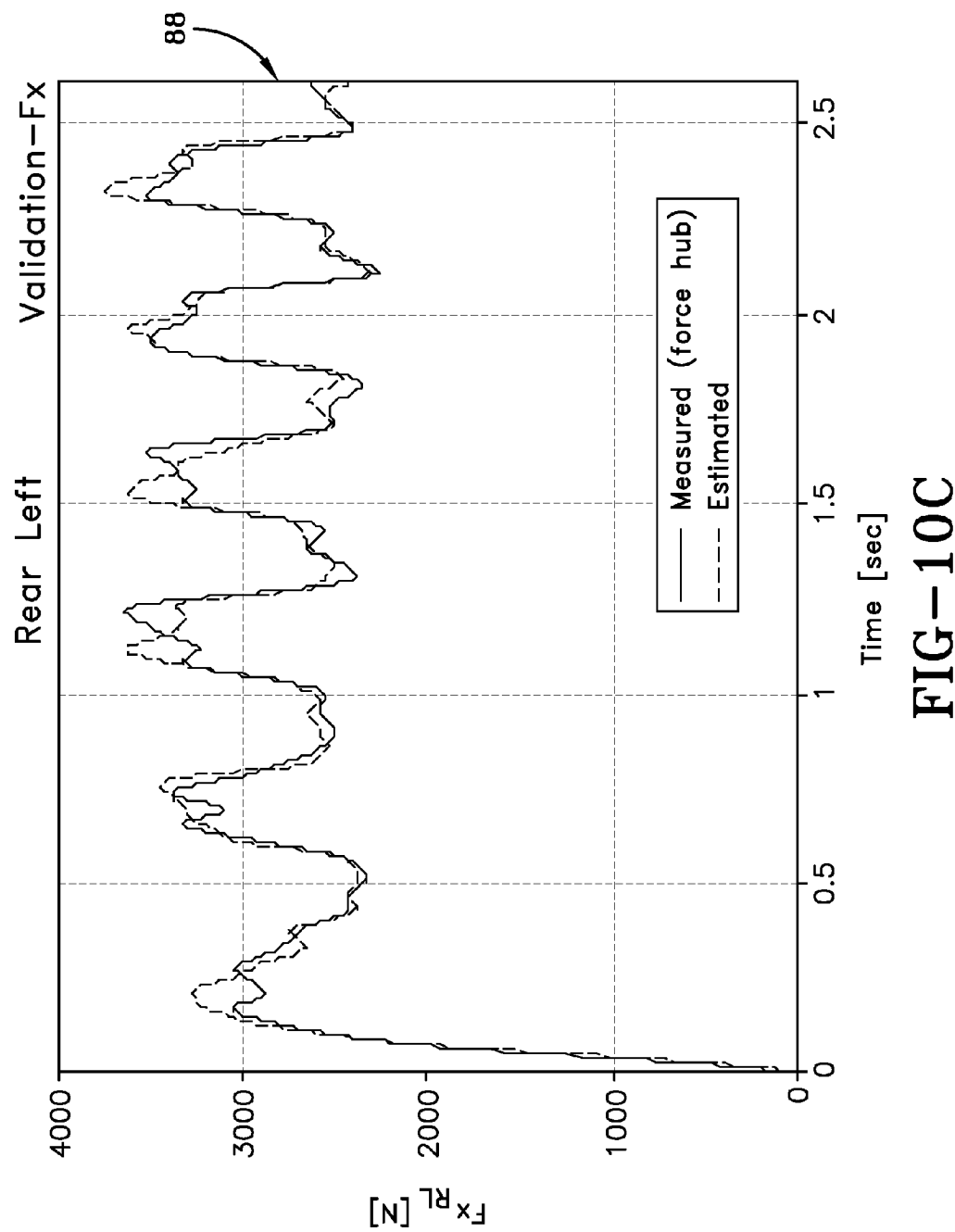
FIG. 10C is a graph similar to FIG. 10A but for the rear left tire.
Figure 10D:
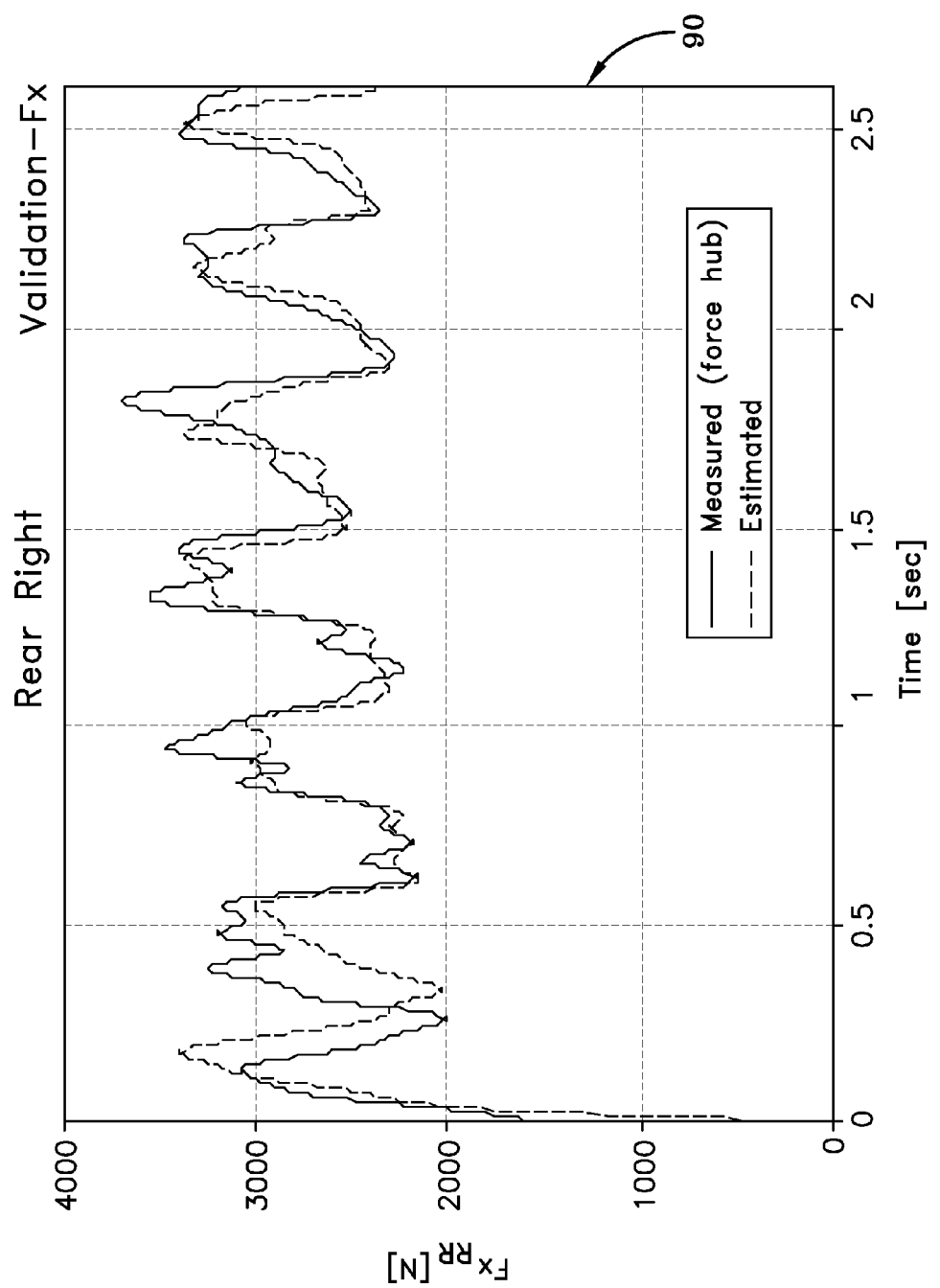
FIG. 10D is a graph similar to FIG. 10A but for the rear left tire.

Measured force hub readings are compared to estimated with the results shown in FIGS. 10A through 10D in experimental validation of $F_x$. FIG. 10A in graph 84 shows $F_x$ for the front left tire, graph 86 of FIG. 10B for the front right, graph 88 of FIG. 10C for the rear left and graph 90 of FIG. 10D for the rear right. Measured vs. estimated shows good correlation.

Figure 11A:
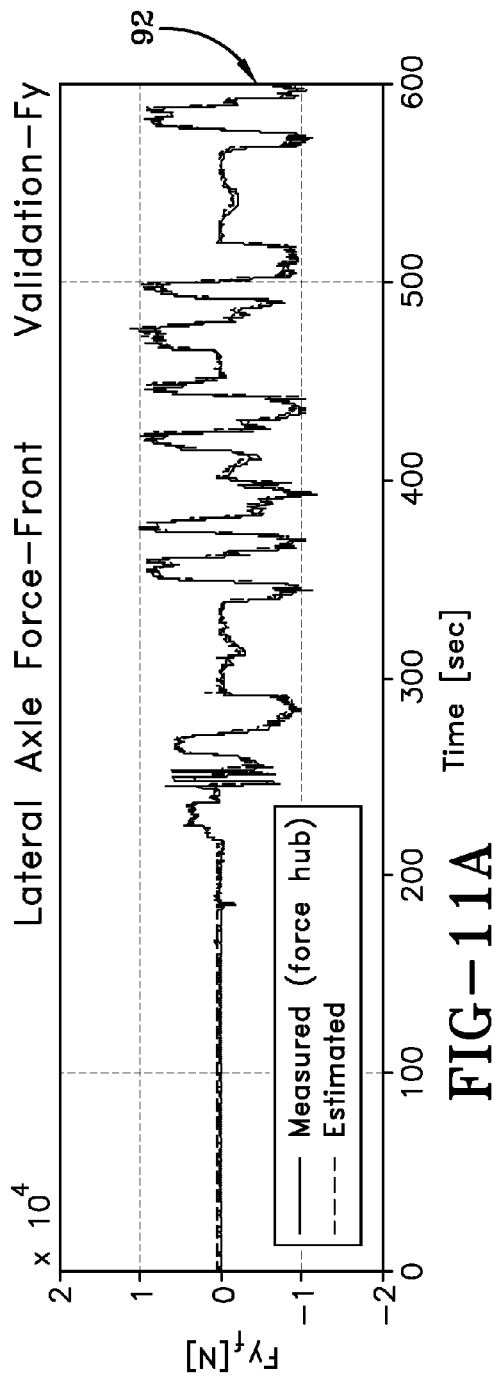
FIGS. 11A and 11B are graphs showing experimental validation via track testing of force estimation $F_y$, comparing estimated with measured $F_y$ for front and rear tires respectively.
Figure 11B:
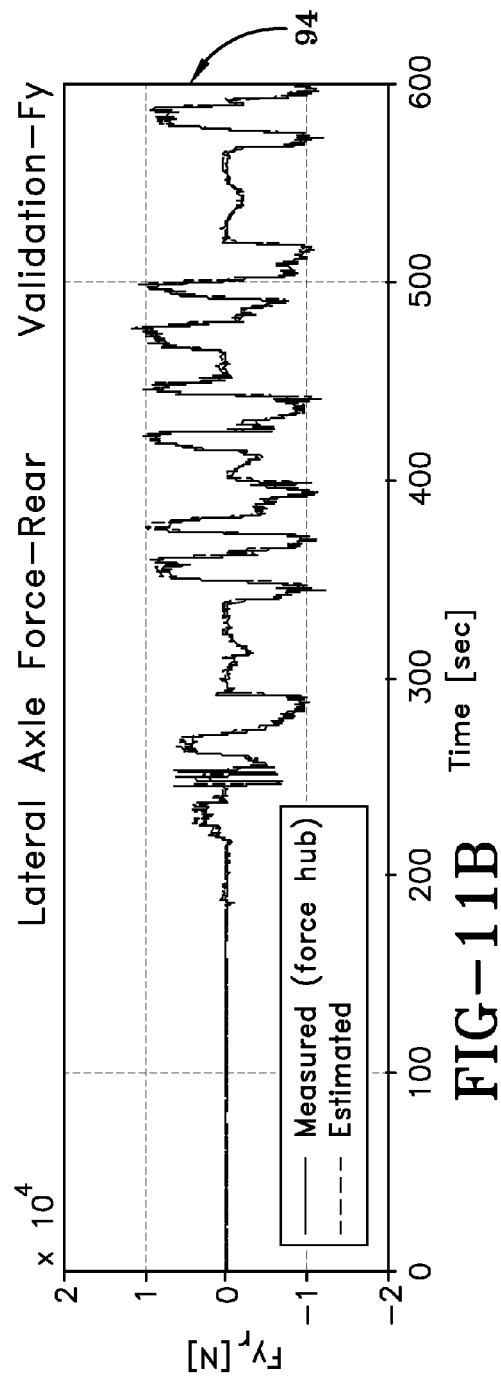
Figure 12:
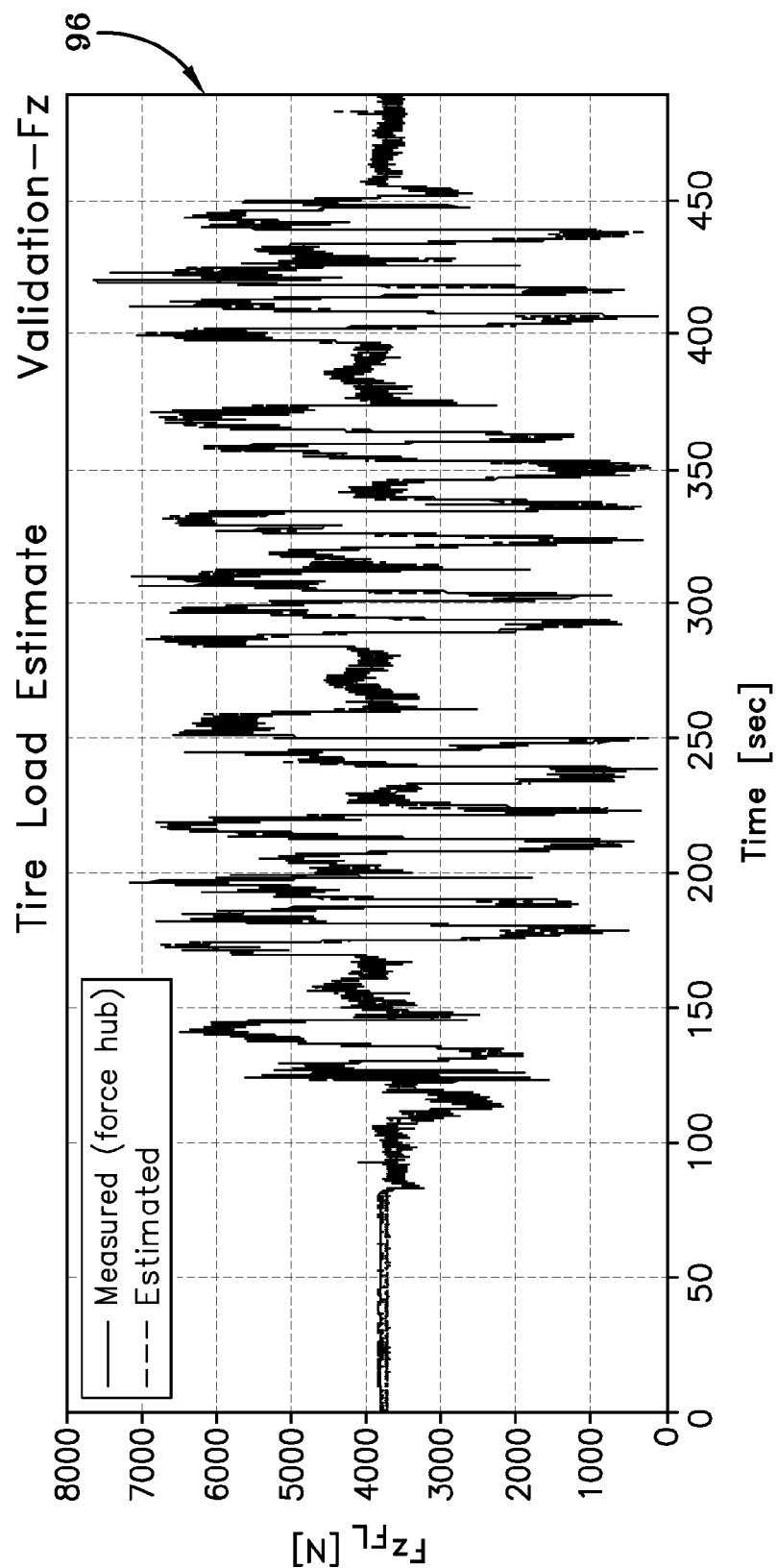
FIG. 12 is a graph showing experimental validation via track testing of tire load estimation $F_z$ for a front left tire and comparing measured with estimated load values.

Validation of $F_y$ estimations using the subject system and method are shown in FIG. 11A graph 92 and FIG. 11B graph 94 for the front and rear axles, respectively. Validation of $F_z$ (tire load estimate) is seen in graph 96 of FIG. 12. Again, good correlation is seen between measured and estimated force values, indicating validation of the subject system and method.

From the foregoing, it will be appreciated that the subject system estimates tire state forces in a robust, accurate and flexible manner through use of CAN-bus accessible sensor data. From the schematics of FIGS. 5A, 5B, and the pending U.S. patent applications incorporated by reference herein and issued U.S. Pat. No. 8,886,395 likewise incorporated by reference herein, the subject system estimates normal force, lateral force and longitudinal force on a tire by accessing a vehicle CAN-bus for vehicle sensor-measured information. Vehicles are equipped with a multiple CAN-bus accessible, vehicle mounted sensors providing by the CAN-bus input sensor data. Such input sensor data includes acceleration and angular velocities, steering wheel angle measurement, angular wheel speed of the wheel, roll rate, pitch rate and yaw rate. The estimation system disclosed deploys a normal force estimator to estimate a normal force on the tire from a summation of longitudinal load transfer, lateral load transfer and static normal force using as inputs lateral acceleration, longitudinal acceleration, and roll angle derived from the input sensor data. The system further deploys a lateral force estimator to estimate a lateral force on the tire from a planar vehicle model using as inputs measured lateral acceleration, longitudinal acceleration and yaw rate derived from the input sensor data. The system further deploys a longitudinal force estimator operable to estimate a longitudinal force on the tire from a wheel rotational dynamics model using as inputs wheel angular speed and drive/brake torque derived from the input sensor data.

The schematics of FIGS. 5A and 5B show use by the system of a roll and pitch angle estimator to generate a roll angle estimation and a pitch angle estimation from the input sensor data; an acceleration bias compensation estimator to generate bias-compensated acceleration data from the roll estimation, the pitch estimation, and the input sensor data; a center of gravity estimator to generate a center of gravity height estimation from the roll angle estimation, the pitch angle estimation, and the input sensor data; a tire rolling radius estimator to generate a tire rolling radius estimation from the input sensor data; a mass estimator to generate a vehicle mass estimation from the tire longitudinal force estimation and a road grade angle input; a center of gravity longitudinal position estimator to generate a vehicle longitudinal center of gravity estimation; and a yaw inertia adaptation model to generate a yaw inertia output from the vehicle mass estimation.

Finally, it will be noted that the subject system configures the CAN-bus input sensor data to exclude data from a global positioning system and data from a suspension displacement sensor. Avoidance of the use of GPS and suspension displacement sensor data makes the inputs to the identified estimators more predictable, accurate, and less susceptible to erroneous sensor readings. As a result, the subject method is considered "robust" and capable of estimation of tire forces in real time on a consistently accurate basis. Such force estimations may then be advantageously applied to various vehicle operating systems such as suspension and braking systems for improve vehicle operability and control.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire state estimation system for estimating normal force, lateral force, and longitudinal force on a tire mounted to a wheel and supporting a vehicle, comprising:
the vehicle including a CAN-bus;
a plurality of sensors mounted to the vehicle and in electronic communication with the CAN-bus;
the sensors generating input sensor data, the input sensor data comprising: acceleration and angular velocities, steering wheel angle measurement, angular wheel speed of the wheel, roll rate, pitch rate, and yaw rate;
a normal force estimator in electronic communication with the CAN-bus and receiving the input sensor data from the sensors, the normal force estimator being operable to estimate a normal force on the tire from a summation of longitudinal load transfer, lateral load transfer and static normal force using as inputs lateral acceleration, longitudinal acceleration and roll angle derived from the input sensor data;
a lateral force estimator in electronic communication with the CAN-bus and receiving the input sensor data from the sensors, the lateral force estimator being operable to estimate a lateral force on the tire from a planar vehicle model using as inputs measured lateral acceleration, longitudinal acceleration and yaw rate derived from the input sensor data; and
a longitudinal force estimator in electronic communication with the CAN-bus and receiving the input sensor data from the sensors, the longitudinal force estimator being operable to estimate a longitudinal force on the tire from a wheel rotational dynamics model using as inputs wheel angular speed and drive/brake torque derived from the input sensor data.

2. The tire state estimation system of claim 1, further comprising:
- a roll and pitch angle estimator in electronic communication with the CAN-bus and receiving the input sensor data from the sensors, the roll and pitch angle estimator being operable to generate a roll angle estimation and a pitch angle estimation from the input sensor data;
- an acceleration bias compensation estimator in electronic communication with the CAN-bus and receiving the input sensor data from the sensors, the acceleration bias compensation estimator being operable to generate bias-compensated acceleration data from the roll estimation, the pitch estimation and the input sensor data;
- a center of gravity estimator in electronic communication with the CAN-bus and receiving the input sensor data from the sensors, the center of gravity estimator being operable to generate a center of gravity height estimation from the roll angle estimation, the pitch angle estimation and the input sensor data;
- a tire rolling radius estimator in electronic communication with the CAN-bus and receiving the input sensor data from the sensors, the tire rolling radius estimator being operable to generate a tire rolling radius estimation from the input sensor data;
- a mass estimator in electronic communication with the CAN-bus and receiving the input sensor data from the sensors, the mass estimator being operable to generate a vehicle mass estimation from the tire longitudinal force estimation and a road grade angle input;
- a center of gravity longitudinal position estimator in electronic communication with the CAN-bus and receiving the input sensor data from the sensors, the center of gravity longitudinal position estimator being operable to generate a vehicle longitudinal center of gravity estimation; and
- a yaw inertia adaptation model in electronic communication with the CAN-bus and receiving the input sensor data from the sensors, the yaw inertia adaptation model being operable to generate a yaw inertia output from the vehicle mass estimation.

3. The tire state estimation system of claim 2, wherein the longitudinal force estimator is operable to generate the tire longitudinal force estimation from the tire rolling radius estimation, an engine torque input, and a braking torque input.

4. The tire state estimation system of claim 2, wherein the normal force estimator is operable to generate the normal force on the tire estimation from the center of gravity height estimation, the center of gravity longitudinal position estimation and the vehicle mass estimation.

5. The tire state estimation system of claim 2, wherein the lateral force estimator is operable to generate the lateral force on the tire from the input sensor data including a measured lateral acceleration, a measured longitudinal acceleration and the yaw rate.

6. The tire state estimation system of claim 5, further comprising:
- an axle force estimator in electronic communication with the CAN-bus, the axle force estimator being operable to generate a lateral force estimation from the vehicle mass estimation, the yaw inertia output, the tire dynamic load estimation, the center of gravity longitudinal position estimation, the bias-compensated acceleration data, a steering wheel angle input, a yaw rate input and the tire dynamic load estimation.

7. The tire state estimation system of claim 2, wherein the acceleration and angular velocities, the pitch rate, the yaw rate and the roll rate are generated from a six degree inertial measuring unit mounted to the vehicle.

8. The tire state estimation system of claim 2, wherein the roll and pitch angle estimator is based upon a kinematics model of the vehicle.

9. The tire state estimation system of claim 2, wherein the center of gravity estimator is based upon a one degree of freedom roll model employing a recursive least squares algorithm.

10. The tire state estimation system of claim 2, the tire longitudinal force estimator is based upon an application of a wheel dynamics model using as model inputs the wheel angular speed and a measured drive and brake torque.

* * * * *